March 2, 1937.  F. E. WOLCOTT  2,072,324
STRAINER FOR BEVERAGE DISPENSING DEVICES
Filed Jan. 3, 1934
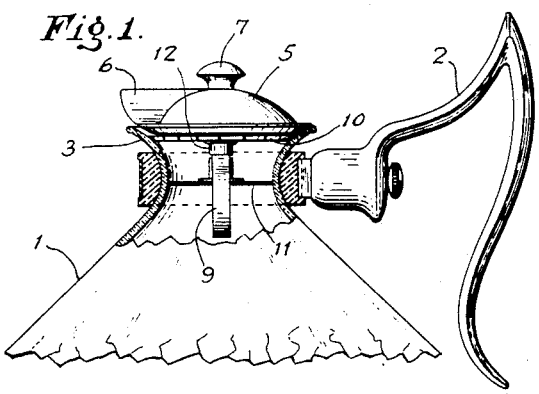
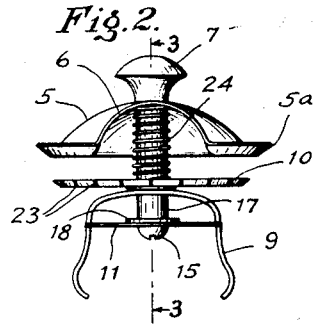
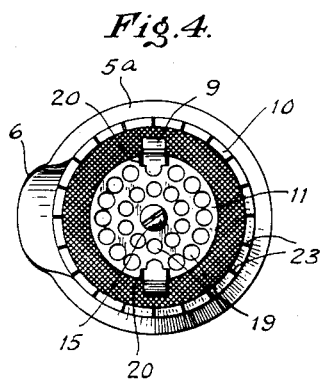
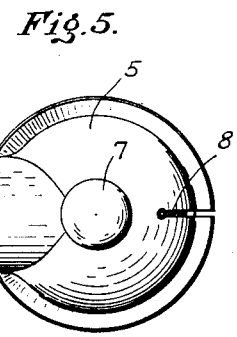
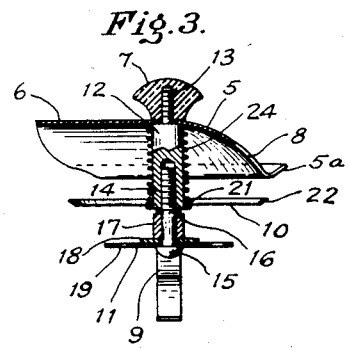
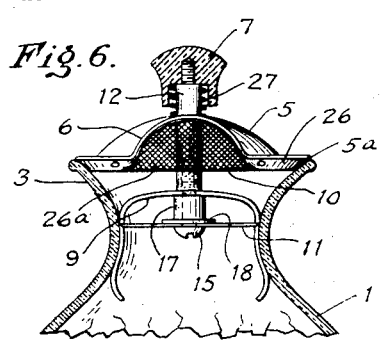
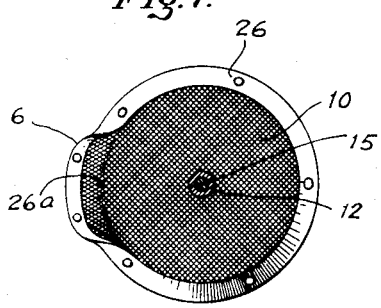
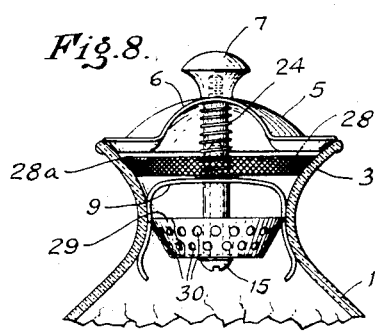
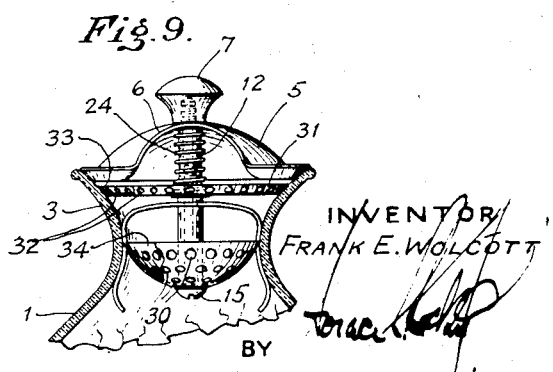
INVENTOR
FRANK E. WOLCOTT
BY
ATTORNEY.

Patented Mar. 2, 1937

2,072,324

UNITED STATES PATENT OFFICE 2,072,324

STRAINER FOR BEVERAGE DISPENSING DEVICES

Frank E. Wolcott, West Hartford, Conn.

Application January 3, 1934, Serial No. 705,092

31 Claims. (Cl. 210—155)

My invention relates to strainers for beverage dispensing devices.

It has, among its objects, to provide an improved strainer for such devices. A further object is to provide an improved strainer adapted to be carried on the cover of a dispensing device such as a bowl used in dispensing tea, coffee, or other beverages, and readily insertable or removable with the cover as a unit. A further object of my invention is to provide such an improved strainer which is adapted to be disposed in the neck of such a dispensing bowl, and which acts effectively to strain the liquid being dispensed, while permitting a full flow of the same, and also being adapted to withstand the pressure and weight of the liquid during pouring and prevent leakage. These and other objects and advantages of my improved construction will, however, hereinafter more fully appear.

In the accompanying drawing I have shown for purposes of illustration several embodiments which my invention may assume in practice.

In the drawing,—

Figure 1 is a side elevation partially in section of one form of my improved strainer applied to a dispensing bowl, the bowl neck and a portion of the handle connection being in section to facilitate illustration.

Figure 2 is an enlarged front elevation of the strainer and cover unit removed from the bowl, the view being taken at right angles to that in Figure 1.

Figure 3 is a vertical sectional view on line 3—3 of Figure 2.

Figure 4 is a bottom plan view of the structure shown in Figure 2.

Figure 5 is a top plan view of the same structure.

Figure 6 is a front view partially in section of a modified construction in position in a bowl neck.

Figure 7 is a bottom plan view of the upper strainer member of Figure 6 when removed from the bowl, the lower strainer support being shown in section.

Figure 8 is a view similar to Figure 6, showing a further modified construction.

Figure 9 is a like view, showing a still further modified construction.

Referring first to the form of my invention shown in Figures 1 to 5, it will be noted that I have shown therein a suitable dispensing container, such as a glass bowl 1, having a suitable handle 2 connected around a constricted upstanding neck 3 thereon, and that I have shown a cover 5 seated in and overlying the neck and having a lateral pouring spout 6 formed thereon and an upstanding handle or knob 7 and an air vent 8, while the cover has an upturned flange 5a suitably positioned in the flared upper end of the neck 3 by spring clips 9 snapped over the constricted portion of the neck 3 within the latter, my improved strainer, hereinafter described, being likewise carried on the unit thus formed and so disposed as to strain the liquid poured out through the neck 3.

Referring more particularly to the strainer construction, it will be noted that I herein provide an upper strainer element 10 and a lower strainer element 11, the same being coaxially disposed and both carried on the supporting means for the spring clip 9. Of these, the strainer element 10 is preferably of larger diameter than the element 11 and disposed above the clip 9, while the element 11 is disposed below the point of connection of the clip to the unit. Thus, it will be noted that means are provided which are not only adapted to co-operate in straining the liquid, but which act upon the same at different points in its flow through the neck, with one element, namely, the lower element 11, disposed substantially at the point of greatest constriction of the neck, and the other, the element 10, supported inside the flaring upper edge of the neck, preferably resiliently, as will hereinafter appear.

Herein, it will be noted that these two elements, 10 and 11, are both carried on a stud 12 which is suitably connected to the knob 7, as by a threaded extension 13 extending through the top of the cover 5, while the stud is also suitably connected, as through a threaded bore 14 in its lower end, to an axial clamping screw 15 for the clip 9. As shown, the intermediate or bowed portion of the latter is perforated, as at 16, to receive the clamping screw 15 and engages the bottom of the stud 12 and is pressed against the same by a suitable underlying spacing sleeve 17, while the latter is, in turn, pressed upward by a washer 18 and the lower strainer element 11 when the head of the screw 15 is brought into engagement with the lower surface of the latter element.

The element 11 is fixed in position relative to the cover 5. Referring more in detail to the construction of this element 11, it will be noted that the same herein is in the form of a flat disk, preferably of metal, and having a considerable number of perforations 19 disposed in the same in such manner as to permit a free flow of liquid therethrough while acting as a screen tending to prevent the passage of larger pieces of material in the liquid flow, such, for example, as large tea leaves. Further, it will be noted that this member or disk 11 is herein provided with cutaway portions 20 on opposite sides of the same, adapted to permit free movement of the arms of the spring clip 9 relative to the same, while having the clip portions in this cutway portion also acting to prevent the passage of large objects through the same. In practice, this disk 11 is also made of such diameter as to provide a space between the periphery of the same and the neck of the bowl through which liquid may also flow but which is not sufficiently wide to permit the passage of large particles. Thus, the strainer element is also adapted to use despite the inherent variations in the minimum diameter of the necks of different glass bowls.

The upper strainer element 10 herein comprises a finer strainer than that provided by element 11 so that the element 10 will tend to strain out any particles not already strained out by the strainer element 11. Herein, this strainer is in the form of a fine wire mesh. Further, it will be noted that it is provided with a suitable axial sleeve portion, herein including a beaded sleeve 21, vertically movable on the outside of the stud 12, while it also is provided with an upturned outwardly inclined flange portion on its periphery adapted to fit the inside of the neck 3 and herein enclosed in a folded over or suitably pressed or attached strip or band of sheet metal 22. As shown, the latter is also provided with suitable small air passage means, herein in the form of radially disposed slots 23 in the outer inclined surface thereof, although other aperture means, such as holes in this rim portion 22, may be provided if desired. Co-operating with this upper strainer element 10 is also spring means, herein in the form of a coiled spring 24 disposed around the stud 12 above the element 10 and pressing at its opposite ends against the inside of the cover 5 and the upper surface of the element 10 in such manner that, when the unit is in position in a bowl neck, the element 10 is forced down and seated against the inside of the top of the neck 3, as illustrated in Figure 1, in such manner as to cause all liquid flow through the neck to be strained by the element 10.

In the use of this construction, it will be evident that, with the parts in the position shown in Figure 1, the lower or coarser strainer element 11 will function to strain out the large particles, while permitting a free flow of liquid past the same, and that any smaller particles will be effectually strained out by the upper, finer strainer element 10. During liquid flow, this element 10 is, of course, pressed down axially in the neck by the coiled spring 24, while the clips 9 cause flange 5a on the cover 5 to be similarly resiliently seated in the bowl neck above the member 10, as shown in Figure 1. Attention is here particularly directed to the fact that continuous pouring is made possible and a full flow, at the same time that effective straining is obtained. Also, the air flow passages, including the vent 8 and the openings through and around the elements 10 and 11, act effectually to insure an adequate and proper air flow, eliminating obstruction of liquid flow. It will further be noted that the construction of the strainer is such as, while permitting effective straining, to withstand the pressure and weight of the liquid even when pouring a full flow through the spout 6 at any time in the process of emptying the bowl 1, while the construction further provides a tight cover effectually preventing leakage around the flanged edge 5a on the rim of the cover 5.

Attention is further directed to the fact that the construction is one which is readily removable with the cover as a unit whenever desired, as, for example, to permit cleaning of the bowl 1. Moreover, it will be noted that the unit is itself also readily cleaned. It will also be observed that, due to the structure provided, not only the cover but the strainer, is adapted to fit accurately in bowl necks despite the wide variation in the latter incident to glass bowls and arising from the impossibility of producing glass bowls in quantity which are all of exactly the same dimensions in the neck. It will, of course, also be evident that the structure is not in any way limited to use with glass bowls and may, if desired, be used with metal bowls. These other advantages of my improved construction will, however, be apparent to those skilled in the art.

In Figures 6 and 7 I have illustrated a modified construction which, while not preferred, may be used if desired. In this construction, the lower element 11 is of the same construction hereinbefore described and carried in the same manner described. The upper element 10, however, is herein in the form of a perforated element, herein also of screen material, and is permanently attached at its outer periphery to the flange 5a by any suitable means, as, for example, by a band 26 similar to the band 22. Moreover, it will be noted that herein the element 10 is extended over the outlet of the spout 6 while being so bowed out and shaped as at 26a as to closely fit the neck rim between the ends of the cover rim 5a, and thus, despite its permanent connection to the cover 5, strain all liquid which flows out of the bowl neck. Attention is further directed to the fact that in this form of construction a coiled spring 27 is disposed between the cover and the knob 7 around a protruding upper portion of an elongated stud 12 which passes through the cover 5, so that both the cover 5 and the strainer element 10 are pressed by this spring 27 against the inside of the top of the neck, as shown in Figure 6.

In Figure 8, I have illustrated a further modified construction. In this construction it will be noted that the upper strainer element, herein indicated at 28, while arranged substantially as described in connection with Figures 1 to 5, spring pressed by a like spring 24 on the stud 12, and also formed of screen material, is provided with an upturned deeper inclined flange or edge of screen material reinforced by an inner rim or bead 28a. The lower strainer element, herein indicated at 29, while of sheet metal is herein in the form of a frustro-conical sleeve provided with perforations 30. As shown, it is also carried by screw 15 in the manner shown in Figure 3 but with the top of the member 29 in the position of the disk 11 therein and the body of 29 extending below it further down into the neck, the screw 15, of course, being longer. In this structure, it will be noted that any tendency of the material to seal off the lower strainer is minimized.

In Figure 9 I have illustrated a still further modified construction in which the top strainer element is in the form of a perforated sheet metal disk 31, spring pressed, and mounted similarly to the element 10, and having suitable small apertures 32 in its bottom and in an upturned inclined flange 33, while the lower strainer element 34 is generally similar to the element 29, but half-round in conformation and similarly provided with perforations, while also being similarly attached by the screw 15 and slotted at its top to permit free movement of the clip 9. In this form of construction, it will be evident that the structure of the upper element is substantially simplified at the same time that it is made more readily cleaned than a screen. Further, both effective straining and a very satisfactory flow are obtainable with the lower elements 34, due, apparently, not only to the further spacing thereof, common also to the member 29 of Fig. 8, but also to the half-round conformation of the member 34.

While I have, in this application, specifically described several forms which my invention may assume in practice, it will be understood that these forms of the same are shown for illustrative purposes and that the invention is not limited to embodiment therein and may be modified and embodied in other forms without departing from its spirit or the scope of the appended claims.

What I claim as new and desire to secure by Letters Patent is:

1. In a dispensing device, a bowl having a neck, a pouring cover having positioning means engaging the interior of said neck only at spaced circumferential points and only partially obstructing the neck, and strainer means carried by said cover and straining the flow through said neck.

2. In a dispensing device, a bowl having a neck, a pouring cover having positioning means engaging the interior of said neck only at spaced circumferential points and only partially obstructing the neck, and strainer means carried by said cover straining the flow through said neck and comprising co-operating strainer elements spaced one above the other in said neck.

3. In a dispensing device, a bowl having a neck, a pouring cover having means for positioning said cover on said neck, and strainer means carried by said cover straining the flow through said neck and comprising an upper strainer element resiliently mounted on said cover, and a lower strainer element fixed to said cover.

4. In a dispensing device, a bowl having a neck, a pouring cover having a depending portion in said neck, strainer means carried by said cover straining the flow through said neck and comprising co-operating strainer elements coaxial with said portion and spaced one above the other in said neck, and cover positioning means connected to said cover portion and having a connection thereto between said strainer elements.

5. In a dispensing device, a bowl having a neck, a pouring cover having a depending portion in said neck, strainer means carried by said cover straining the flow through said neck comprising co-operating strainer elements coaxial with said portion and spaced one above the other in said neck, and a cover positioning clip connected to said cover portion having a connection thereto between said strainer elements and having depending spring arms laterally movable relative to the lower element.

6. In a dispensing device, a bowl having a neck, a pouring cover, strainer means carried by said cover straining the flow through said neck comprising co-operating strainer elements spaced one above the other in said neck, and co-operating resilient means acting axially of said neck for seating said cover and one strainer element in engagement with said neck.

7. In a dispensing device, a bowl having a neck, a pouring cover having positioning means in said neck and an axial support therefor, strainer means carried by said support straining the flow through said neck and comprising co-operating strainer elements spaced one above the other in said neck, and resilient means acting axially of said neck for seating the upper strainer element in engagement with said neck.

8. In a dispensing device, a bowl having a bell-mouthed neck, a pouring cover having depending spring members seated in said neck, and a strainer element disposed to strain all liquid flowing through said neck and removable with said pouring cover as a unit.

9. In a dispensing device, a bowl having a neck, a pouring cover having positioning means in said neck, and a strainer element disposed to strain all liquid flowing through said neck and removable with said pouring cover as a unit, said strainer element being seated in engagement with said neck below said cover and having resilient seating means acting axially of said neck.

10. In a dispensing device, a bowl having a bell-mouthed neck, a pouring cover having positioning means engageable with an aperture neck and having a depending axial rod in said neck, and strainer means therein below said cover and coaxial with said rod disposed to strain all liquid flowing through said neck and removable with said cover as a unit and comprising co-operating strainers one in the mouth of said neck and the other spaced below said mouth.

11. In a dispensing device, a bowl having a neck, a pouring cover having positioning means in said neck, and a strainer element disposed to strain all liquid flowing through said neck and removable with said pouring cover as a unit, said cover having a pouring aperture and a peripheral flange and said strainer element being fixed to said flange and screening said pouring aperture while fitting said neck.

12. In a dispensing device, a bowl having a neck, a pouring cover having positioning means in said neck, and a strainer element disposed to strain all liquid flowing through said neck and removable with said pouring cover as a unit, said neck and said strainer element having correspondingly tapered co-operating inner and outer peripheries respectively.

13. In a dispensing device, a bowl having a neck, a pouring cover having positioning means in said neck, and a strainer element disposed to strain all liquid flowing through said neck and removable with said pouring cover as a unit, said neck and said strainer element having correspondingly tapered co-operating inner and outer peripheries respectively and said strainer element having its outer periphery engageable with the inner periphery of said neck and spring means forcing the same into engagement.

14. In a dispensing device, a bowl having a constricted neck, a pouring cover seated at the top of said neck above the constricted portion thereof and having positioning means engaging the interior of said neck only at spaced circumferential points and only partially obstructing the neck, and a strainer element spaced below said cover and in the constricted portion of said neck and removable with said cover as a unit.

15. In a dispensing device, a bowl having a constricted neck, a cover seated at the top of said neck above the constricted portion thereof and having yielding positioning means engaging over the interior of said constricted portion only at spaced circumferential points and only partially obstructing the neck, and a strainer element resiliently carried by said cover and engaging the interior of said neck above said constricted portion and below said cover.

16. In a dispensing device, a bowl having a constricted neck, a cover seated at the top of said neck above the constricted portion thereof and having positioning means engaging said constricted portion, and a strainer element carried by said cover and disposed in said constricted portion below said cover, said positioning means comprising spring clip members and said strainer element having passage means for the latter therethrough.

17. In a dispensing device, a bowl having a constricted neck, a pouring cover having positioning means engaging over said constricted portion, a strainer member carried by said cover and resiliently seated in engagement with the top of said neck below said cover, and a cooperating strainer element likewise carried by said cover and disposed in said constricted portion below said first mentioned strainer member.

18. In a dispensing device, a pouring cover having positioning means engageable with a receptacle neck and having a depending axial rod disposable in said neck, and strainer means carried by and coaxial with said rod straining the flow through said neck.

19. In a strainer, a pouring cover having depending positioning means thereon, and a strainer member resiliently mounted on said cover and movable between the same and said positioning means.

20. In a strainer, a pouring cover having an axial portion and depending positioning means thereon, and a strainer member disposed below the point of connection of said positioning means to said axial portion and carried by said portion.

21. A strainer device having an axially disposed member, means on the latter for positioning the same in the neck of a receptacle while permitting free flow along the exterior of said members through said neck, a strainer reciprocably mounted on said member, and a coiled spring on said member acting on said strainer and urging the latter longitudinally of said member.

22. In a strainer, a pouring cover having an axial rod and depending positioning means thereon, and a plurality of superimposed straining means on said rod and one above and the other below the upper end of said positioning means.

23. In a strainer, a pouring cover having depending positioning means thereon, a strainer member resiliently mounted on a portion of said positioning means and movable beneath said cover on said portion, and a cooperating strainer member disposed below said first mentioned strainer member and likewise carried by said portion.

24. In a strainer, a cover having depending positioning means and an axial support for the latter carried by said cover, and a strainer member disposed below the point of connection of said positioning means to said support and carried by said support and having a hollow depending perforated portion open at the top and of greater diameter at the top than at the bottom.

25. In a strainer, a pouring cover having an axial rod and depending positioning means thereon receivable in an open neck, and a hollow generally semi-spherical strainer carried on said axial rod and disposed in spaced relation below said cover and having an open top and curved upwardly and outwardly sloping perforated sides.

26. In a strainer, a cover having depending positioning means thereon, a strainer member resiliently mounted on said cover and movable between the same and said positioning means, and a co-operating strainer member disposed below the point of connection of said positioning means to said cover and carried by said cover, said strainer members comprising coaxial perforated elements of different diameter open at the top and of larger diameter at the top than at the bottom.

27. A strainer device having an axially disposed member, means on the latter for positioning the same in the neck of a receptacle, and a plurality of superimposed strainers of different diameter carried on said member and spaced from one another, the lower of said strainers being of smaller diameter and rigidly connected to said member and the upper being of larger diameter and resiliently mounted on said member.

28. In a strainer, a strainer member, a member disposed coaxially therewith and having an upstanding handle portion projecting above said strainer member, spring means for positioning said strainer member depending below the latter, and means for connecting said strainer member, coaxial member, and spring means to form a unit and disposed axially of said coaxial member and connectible from below said strainer member.

29. In combination, a bowl having an axial aperture presenting a constricted portion and a lower portion of larger diameter opening through said aperture, a strainer member straining the flow through said axial aperture and overlying the latter, a member disposed coaxially with said strainer member and having an upstanding handle portion projecting above said strainer member, and spring means depending below said strainer member for positioning the latter snapping over said constricted portion and extending into said portion of larger diameter below said axial aperture.

30. In a strainer, a cover having means for positioning the same on a neck, a strainer carried on said cover below the latter and having a periphery engageable with the inner surface of a flaring neck, and means carried by said cover for seating said strainer at different heights in such a neck dependent upon the diameter of the neck.

31. In a strainer, a pouring cover having means for positioning the same in a receptacle neck, a strainer carried on said cover below the latter and having a tapered periphery engageable with the inner surface of a flaring neck, and means carried by said cover for seating said strainer at different heights in such a neck dependent upon the diameter of the neck, said cover likewise having a tapered periphery receivable in the upper end of a flaring neck and engageable therewith by said positioning means.

FRANK E. WOLCOTT.